GEORGE W. SPOTS, OF JACKSONVILLE, ILLINOIS.

Letters Patent No. 83,737, dated November 3, 1868.

---

IMPROVED COMPOUND FOR DESTROYING INSECTS ON TREES, PLANTS, &c.

---

The Schedule referred to in these Letters Patent and making part of the same.

---

*To all whom it may concern:*

Be it known that I, GEORGE W. SPOTS, of Jacksonville, in the county of Morgan, and State of Illinois, have invented a new and improved Composition; and I do hereby declare the following is a full, clear, and exact description of the construction and operation of the same.

This invention has for its object to furnish a substance for preventing the ravages of curculio and insects destructive to fruit-trees, vines, and vegetables. To this end, the invention consists in a compound, formed, in a simple manner, of ingredients which are cheap and abundant in every part of the country.

The nature of the compound which I employ for the purpose may be described as follows:

Take one gallon of rain-water, soak therein one-half pound of common leaf-tobacco, and get all the strength out, so as to make the solution as strong as the tobacco will make it. To this gallon of fluid, add a half-pound of unslaked lime, and one ounce of flour of sulphur. If more than a gallon is needed, add the like proportion to each gallon.

With this preparation wash the fruit-tree, (using a broom, brush, or any other convenient instrument,) from the leaves to the root, as often as once a week, during the prevalence of the destroying insect.

On vines and other small vegetables, use the fluid by sprinkling it over them.

In all cases use the wash after a rain.

Having thus described my invention,

What I claim as new, and desire to secure by Letters Patent, is—

The composition, substantially as and for the purpose above set forth.

To the above specification of my discovery and improvement I have signed my hand this 21st day of September, 1868.

GEORGE W. SPOTS.

Witnesses:
   M. M. CONNEL,
   F. G. FARRELL.